United States Patent
Tamura et al.

(10) Patent No.: US 9,366,567 B2
(45) Date of Patent: Jun. 14, 2016

(54) FOCUSING DEVICE INCLUDING A DIFFERENTIAL INTERFERENCE PRISM

(71) Applicant: OLYMPUS CORPORATION, Shibuya-ku, Tokyo (JP)

(72) Inventors: Yosuke Tamura, Kawaguchi (JP); Toshiya Komuro, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 115 days.

(21) Appl. No.: 14/288,173

(22) Filed: May 27, 2014

(65) Prior Publication Data
US 2014/0368833 A1 Dec. 18, 2014

(30) Foreign Application Priority Data
Jun. 13, 2013 (JP) .................................. 2013-125005

(51) Int. Cl.
| | | |
|---|---|---|
| *G01B 9/04* | (2006.01) | |
| *G01J 1/42* | (2006.01) | |
| *G02B 7/28* | (2006.01) | |
| *G02B 21/24* | (2006.01) | |
| *G02B 21/00* | (2006.01) | |

(52) U.S. Cl.
CPC ... *G01J 1/42* (2013.01); *G01B 9/04* (2013.01); *G01J 1/4257* (2013.01); *G02B 7/28* (2013.01); *G02B 21/247* (2013.01); *G02B 21/0092* (2013.01)

(58) Field of Classification Search
CPC .. G02B 27/40; G02B 9/0219; G02B 21/0056; G02B 21/006; G02B 21/008; G02B 21/0092; G02B 21/14; G02B 21/244–21/247; G02B 7/28; G02B 7/282; G01B 9/04; G01B 9/02063; G01B 9/02; G01J 1/42; G01J 1/4257
See application file for complete search history.

(56) References Cited

U.S. PATENT DOCUMENTS

| | | | | |
|---|---|---|---|---|
| 4,653,923 | A * | 3/1987 | Kitabayashi | G01B 9/0203 356/124 |
| 5,483,079 | A * | 1/1996 | Yonezawa | G02B 21/247 250/201.4 |
| H1972 | H * | 7/2001 | Inoue | 356/450 |
| 6,545,761 | B1 * | 4/2003 | Aziz | G01B 9/04 356/497 |
| 2001/0010597 | A1 * | 8/2001 | Hamanaka | C03B 11/08 359/619 |
| 2011/0228070 | A1 * | 9/2011 | Mehanian | H04N 5/23248 348/79 |

FOREIGN PATENT DOCUMENTS

| | | |
|---|---|---|
| JP | 2000-199846 A | 7/2000 |
| JP | 4350186 B2 | 10/2009 |

* cited by examiner

*Primary Examiner* — Michael P LaPage
(74) *Attorney, Agent, or Firm* — Holtz, Holtz & Volek PC

(57) ABSTRACT

A focusing device that includes a differential interference prism used in differential interference observation in a focusing detection optical system includes: a light source that emits light with which a measurement surface of an observation sample is irradiated; a photo detection unit that detects light from the measurement surface; a focusing detection unit that detects an error signal near a focusing point of the measurement surface on the basis of an output signal from the photo detection unit; and a condition changing unit that changes an acquisition condition of the error signal.

8 Claims, 20 Drawing Sheets

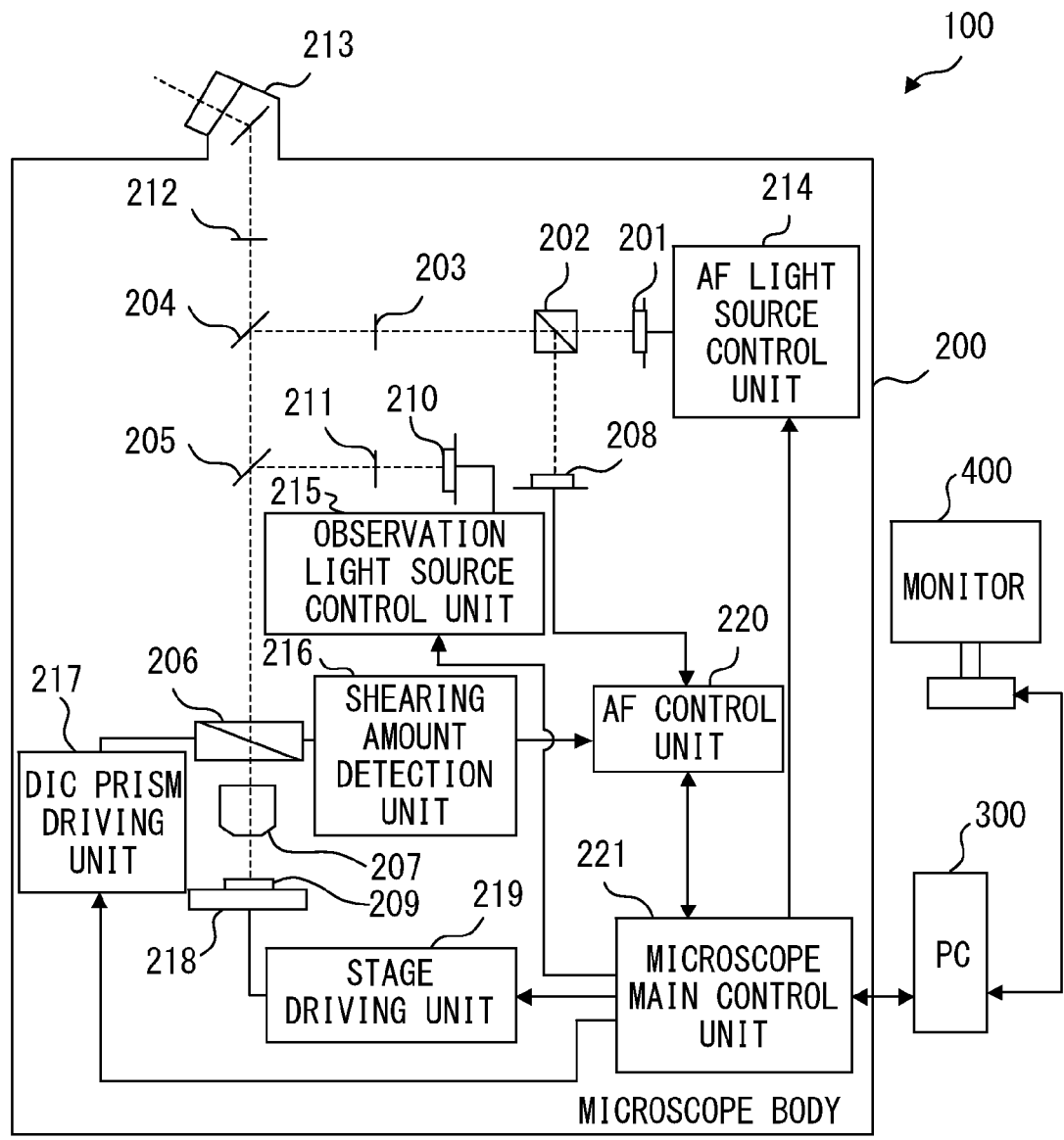
F I G. 1

241

| SHEARING AMOUNT θ [a.u.] | AF SIGNAL INTENSITY [a.u.] | SHEARING REGION<br>0: AF SIGNAL INTENSITY = PEAK<br>1: AF SIGNAL INTENSITY ≧ 50% OF PEAK<br>2: 50% OF PEAK > AF SIGNAL INTENSITY |
|---|---|---|
| 0 | 2000 | 2 |
| 100 | 3000 | 1 |
| 200 | 5000 (Peak) | 0 |
| 300 | 3000 | 1 |
| 400 | 2000 | 2 |
| 500 | 1000 | 2 |
| 600 | 100 | 2 |
| 700 | 1000 | 2 |
| 800 | 2000 | 2 |
| 900 | 3000 | 1 |
| 1000 | 4000 | 1 |

FIG. 3

| SHEARING AMOUNT θ [a.u.] | SHEARING REGION |
|---|---|
| 0 | 2 |
| 100 | 1 |
| 200 | 1 |
| 300 | 1 |
| 400 | 2 |
| 500 | 2 |
| 600 | 2 |
| 700 | 2 |
| 800 | 2 |
| 900 | 1 |
| 1000 | 1 |

241

F I G. 4

241

| SHEARING AMOUNT θ [a.u.] | AF SIGNAL INTENSITY [a.u.] | SHEARING REGION 1: AF SIGNAL INTENSITY ≧ 50% OF PEAK 2: 50% OF PEAK > AF SIGNAL INTENSITY |
|---|---|---|
| 0 | 2000 | 2 |
| 100 | 3000 | 1 |
| 200 | 5000 (Peak) | 1 |
| 300 | 3000 | 1 |
| 400 | 2000 | 2 |
| 500 | 1000 | 2 |
| 600 | 100 | 2 |
| 700 | 1000 | 2 |
| 800 | 2000 | 2 |
| 900 | 3000 | 1 |
| 1000 | 4000 | 1 |

F I G. 5

| SHEARING AMOUNT θ [a.u.] | AF SIGNAL INTENSITY [a.u.] | SHEARING REGION<br>1: AF SIGNAL INTENSITY ≧ 50% OF PEAK<br>2: 50% OF PEAK > AF SIGNAL INTENSITY ≧ 30% OF PEAK<br>3: 30% OF PEAK > AF SIGNAL INTENSITY ≧ 10% OF PEAK<br>4: 10% OF PEAK > AF SIGNAL INTENSITY |
|---|---|---|
| 0 | 2000 | 2 |
| 100 | 3000 | 1 |
| 200 | 5000 (Peak) | 1 |
| 300 | 3000 | 1 |
| 400 | 2000 | 2 |
| 500 | 1000 | 3 |
| 600 | 100 | 4 |
| 700 | 1000 | 3 |
| 800 | 2000 | 2 |
| 900 | 3000 | 1 |
| 1000 | 4000 | 1 |

F I G. 6

| SHEARING REGION<br>1: AF SIGNAL INTENSITY ≧ 50% OF PEAK<br>2: 50% OF PEAK > AF SIGNAL INTENSITY ≧ 30% OF PEAK<br>3: 30% OF PEAK > AF SIGNAL INTENSITY ≧ 10% OF PEAK<br>4: 10% OF PEAK > AF SIGNAL INTENSITY | ADDITION VALUE (TO MAXIMUM INTEGRATION TIME) [a.u.] | COEFFICIENT (TO MAXIMUM INTEGRATION TIME) [a.u.] | DUTY RATIO (OF LASER PULSE) [a.u.] | COEFFICIENT (TO LASER OUTPUT) [a.u.] | COEFFICIENT (TO AF SIGNAL INTENSITY) [a.u.] |
|---|---|---|---|---|---|
| 1 | +0 | X1.0 | 50% | X1.0 | X1.0 |
| 2 | +3 | X1.3 | 70% | X1.3 | X1.3 |
| 3 | +5 | X1.6 | 80% | X1.6 | X1.6 |
| 4 | +10 | X2.0 | 100% | X2.0 | X2.0 |

| SHEARING REGION  1: AF SIGNAL INTENSITY ≧ 50% OF PEAK  2: 50% OF PEAK > AF SIGNAL INTENSITY | OBJECTIVE LENS | ADDITION VALUE (TO MAXIMUM INTEGRATION TIME) [a.u.] | COEFFICIENT (TO MAXIMUM INTEGRATION TIME) [a.u.] | DUTY RATIO (OF LASER PULSE) [%] | COEFFICIENT (TO LASER OUTPUT) [a.u.] | COEFFICIENT (TO AF SIGNAL INTENSITY) [a.u.] |
|---|---|---|---|---|---|---|
| 1 | – | +0 | X1.0 | 50% | X1.0 | X1.0 |
| 2 | 5x | +3 | X1.3 | 70% | X1.3 | X1.3 |
| 2 | 10x | +3 | X1.3 | 70% | X1.3 | X1.3 |
| 2 | 50x | +5 | X1.6 | 80% | X1.6 | X1.6 |
| 2 | 100x | +10 | X2.0 | 100% | X2.0 | X2.0 |

| SHEARING REGION<br>1: AF SIGNAL INTENSITY ≧ 50% OF PEAK<br>2: 50% OF PEAK > AF SIGNAL INTENSITY ≧ 30% OF PEAK<br>3: 30% OF PEAK > AF SIGNAL INTENSITY ≧ 10% OF PEAK<br>4: 10% OF PEAK > AF SIGNAL INTENSITY | OBJECTIVE LENS | ADDITION VALUE (TO MAXIMUM INTEGRATION TIME) [a.u.] | CO-EFFICIENT (TO MAXIMUM INTEGRATION TIME) [a.u.] | DUTY RATIO (OF LASER PULSE) [%] | CO-EFFICIENT (TO LASER OUTPUT) [a.u.] | CO-EFFICIENT (TO AF SIGNAL INTENSITY) [a.u.] |
|---|---|---|---|---|---|---|
| 1 | — | +0 | X1.0 | 50% | X1.0 | X1.0 |
| 2 | 5x | +1 | X1.1 | 55% | X1.1 | X1.1 |
| 2 | 10x | +1 | X1.1 | 55% | X1.1 | X1.1 |
| 2 | 50x | +2 | X1.2 | 55% | X1.2 | X1.2 |
| 2 | 100x | +3 | X1.2 | 60% | X1.2 | X1.2 |
| 3 | 5x | +2 | X1.2 | 60% | X1.2 | X1.2 |
| 3 | 10x | +2 | X1.2 | 60% | X1.2 | X1.2 |
| 3 | 50x | +3 | X1.4 | 65% | X1.4 | X1.4 |
| 3 | 100x | +4 | X1.6 | 80% | X1.6 | X1.6 |
| 4 | 5x | +3 | X1.3 | 70% | X1.3 | X1.3 |
| 4 | 10x | +3 | X1.3 | 70% | X1.3 | X1.3 |
| 4 | 50x | +5 | X1.6 | 80% | X1.6 | X1.6 |
| 4 | 100x | +10 | X2.0 | 100% | X2.0 | X2.0 |

252

F I G. 1 4

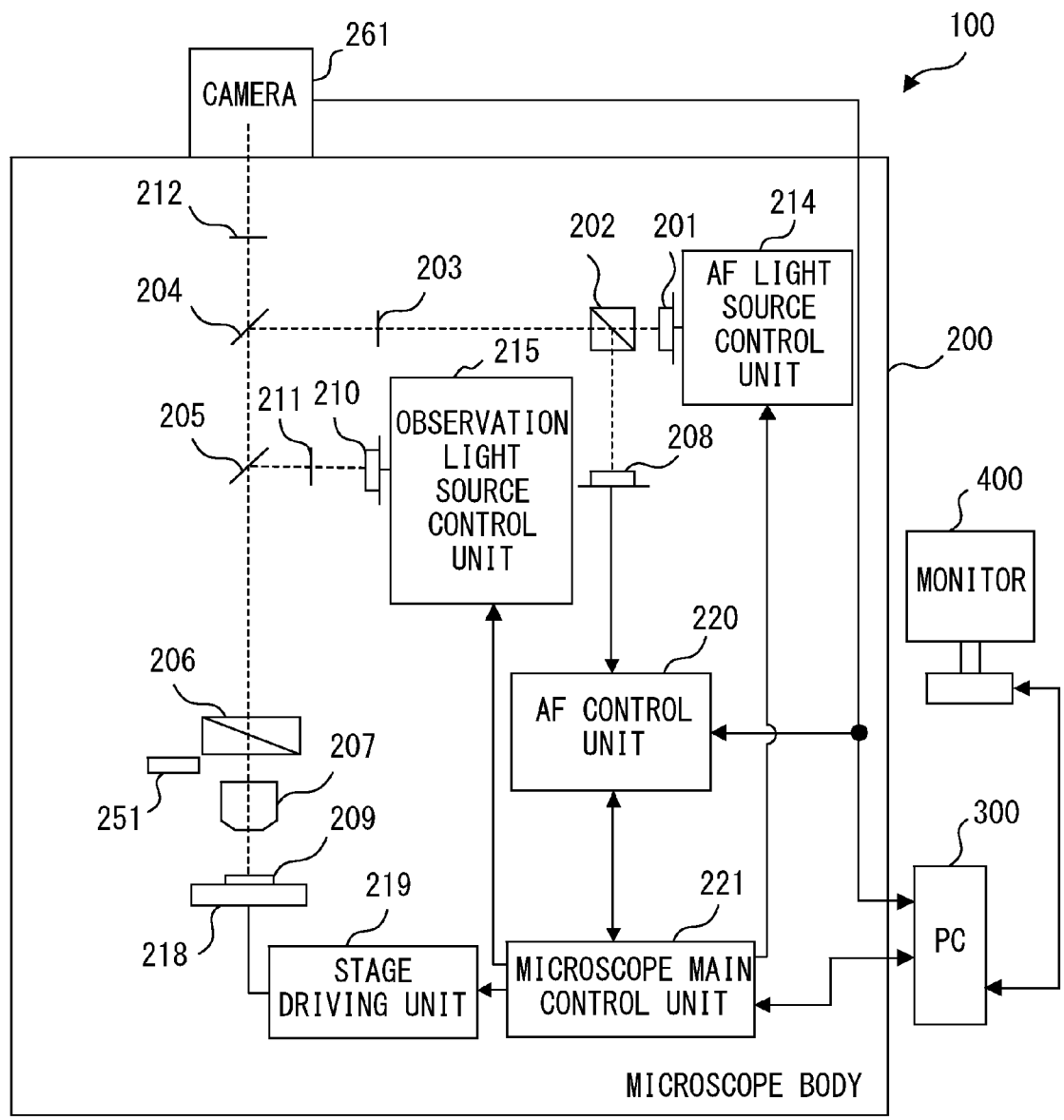
F I G. 15

FIG. 17

| # | R | G | B | AF SIGNAL INTENSITY [a.u.] | SHEARING REGION 1: AF SIGNAL INTENSITY ≧ 1000 2: 1000 > AF SIGNAL INTENSITY |
|---|---|---|---|---|---|
| 1 | 58 | 196 | 169 | 2765 | 1 |
| 2 | 57 | 192 | 163 | 1483 | 1 |
| 3 | 127 | 138 | 189 | 636 | 2 |
| 4 | 185 | 75 | 182 | 4275 | 1 |
| 5 | 204 | 53 | 167 | 9416 | 1 |
| 6 | 213 | 65 | 121 | 1395 | 1 |
| 19 | 171 | 30 | 37 | 13582 | 1 |
| 20 | 207 | 95 | 11 | 7620 | 1 |
| 21 | 225 | 165 | 34 | 1736 | 1 |
| 22 | 239 | 203 | 93 | 790 | 2 |
| 23 | 247 | 222 | 149 | 683 | 2 |
| 27 | 222 | 209 | 177 | 20410 | 1 |
| 28 | 204 | 189 | 152 | 27712 | 1 |
| 29 | 144 | 124 | 89 | 33933 | 1 |
| 30 | 65 | 50 | 34 | 39480 | 1 |
| 31 | 22 | 16 | 8 | 43472 | 1 |
| 32 | 37 | 31 | 22 | 44800 | 1 |
| 33 | 118 | 105 | 79 | 44244 | 1 |
| 34 | 180 | 167 | 132 | 41100 | 1 |
| 35 | 216 | 204 | 171 | 36404 | 1 |

| SHEARING REGION<br>1: AF SIGNAL INTENSITY ≧ 1000<br>2: 1000 > AF SIGNAL INTENSITY | ADDITION VALUE (TO MAXIMUM INTEGRATION TIME) [a.u.] | COEFFICIENT (TO MAXIMUM INTEGRATION TIME) [a.u.] | DUTY RATIO (OF LASER PULSE) [a.u.] | COEFFICIENT (TO LASER OUTPUT) [a.u.] | COEFFICIENT (TO AF SIGNAL INTENSITY) [a.u.] |
|---|---|---|---|---|---|
| 1 | +0 | X1.0 | 50% | X1.0 | X1.0 |
| 2 | +10 | X2.0 | 100% | X2.0 | X2.0 |

252

| SHEARING REGION 1: AF SIGNAL INTENSITY ≧ 1000 2: 1000 > AF SIGNAL INTENSITY | OBJECTIVE LENS | ADDITION VALUE (TO MAXIMUM INTEGRATION TIME) [a.u.] | COEFFICIENT (TO MAXIMUM INTEGRATION TIME) [a.u.] | DUTY RATIO (OF LASER PULSE) [a.u.] | COEFFICIENT (TO LASER OUTPUT) [a.u.] | COEFFICIENT (TO AF SIGNAL INTENSITY) [a.u.] |
|---|---|---|---|---|---|---|
| 1 | - | +0 | X1.0 | 50% | X1.0 | X1.0 |
| 2 | 5x | +3 | X1.3 | 70% | X1.3 | X1.3 |
| 2 | 10x | +3 | X1.3 | 70% | X1.3 | X1.3 |
| 2 | 50x | +5 | X1.6 | 80% | X1.6 | X1.6 |
| 2 | 100x | +1 | X2.0 | 100% | X2.0 | X2.0 |

FIG. 20

FOCUSING DEVICE INCLUDING A DIFFERENTIAL INTERFERENCE PRISM

CROSS REFERENCE TO RELATED APPLICATIONS

This application is based upon and claims the benefit of priority from the prior Japanese Patent Application No. 2013-125005, filed Jun. 13, 2013, the entire contents of which are incorporated herein by reference.

BACKGROUND OF THE INVENTION

1. Field of the Invention

The present invention is related to a focusing device that includes a differential interference prism used in differential interference observation in a focusing detection optical system.

2. Description of the Related Art

Conventionally, a microscope device has been used that includes a focusing detection mechanism (e.g., an active AF (Auto Focus) mechanism) and a differential interference observation mechanism. In such a microscope device, a portion of a focusing detection optical system is used in common with a portion of a differential interference observation optical system, and a differential interference prism is provided to the portion of the focusing detection optical system. Therefore, also in the focusing detection by the focusing detection mechanism in differential interference observation, light (in this case, light for focusing detection) passes through the differential interference prism.

As an example, in a focusing device described in Japanese Laid-Open Patent Publication No. 2000-199846, when it is determined that focusing is not performed, a differential interference prism is driven outside an optical path, and a focusing determination is performed. After focusing is performed, the differential interference prism is driven to return in the optical path with a focusing position maintained so as to enable focusing detection.

In recent years, not only enabling highly accurate focusing detection but also shortening the time needed for the focusing detection has been desired strongly.

SUMMARY OF THE INVENTION

One aspect of the present invention is related to a focusing device that includes a differential interference prism used in differential interference observation in a focusing detection optical system, and the focusing device includes a light source, a photo detection unit, a focusing detection unit, and a condition changing unit. The light source emits light with which a measurement surface of an observation sample is irradiated. The photo detection unit detects light from the measurement surface. The focusing detection unit detects an error signal near a focusing point of the measurement surface on the basis of an output signal from the photo detection unit. The condition changing unit changes an acquisition condition of the error signal.

BRIEF DESCRIPTION OF THE DRAWINGS

FIG. 1 illustrates an example of a configuration of a microscope device that includes a focusing device and a differential interference observation mechanism in Embodiment 1;

FIG. 3 is a first diagram illustrating an example of a shearing amount management table generated according to the shearing amount management table generation procedure;

FIG. 4 is a second diagram illustrating an example of a shearing amount management table generated according to the shearing amount management table generation procedure;

FIG. 5 is a third diagram illustrating an example of a shearing amount management table generated according to the shearing amount management table generation procedure;

FIG. 6 is a fourth diagram illustrating an example of a shearing amount management table generated according to the shearing amount management table generation procedure;

FIG. 11 is a second diagram illustrating an example of an error signal acquisition condition table;

FIG. 13 is a first diagram illustrating an example of an error signal acquisition condition table that includes a correspondence relation with the type of objective lens;

FIG. 14 is a second diagram illustrating an example of an error signal acquisition condition table that includes a correspondence relation with the type of objective lens;

FIG. 15 illustrates an example of a configuration of a microscope device that includes a focusing device and a differential interference observation mechanism in Embodiment 3;

FIG. 17 illustrates an example of a color information management table generated according to the a color information management table generation procedure;

FIG. 18 illustrates an example of an error signal acquisition condition table;

FIG. 20 illustrates an example of an error signal acquisition condition table that includes a correspondence relation with the type of objective lens.

DESCRIPTION OF THE PREFERRED EMBODIMENT

Figure 2:
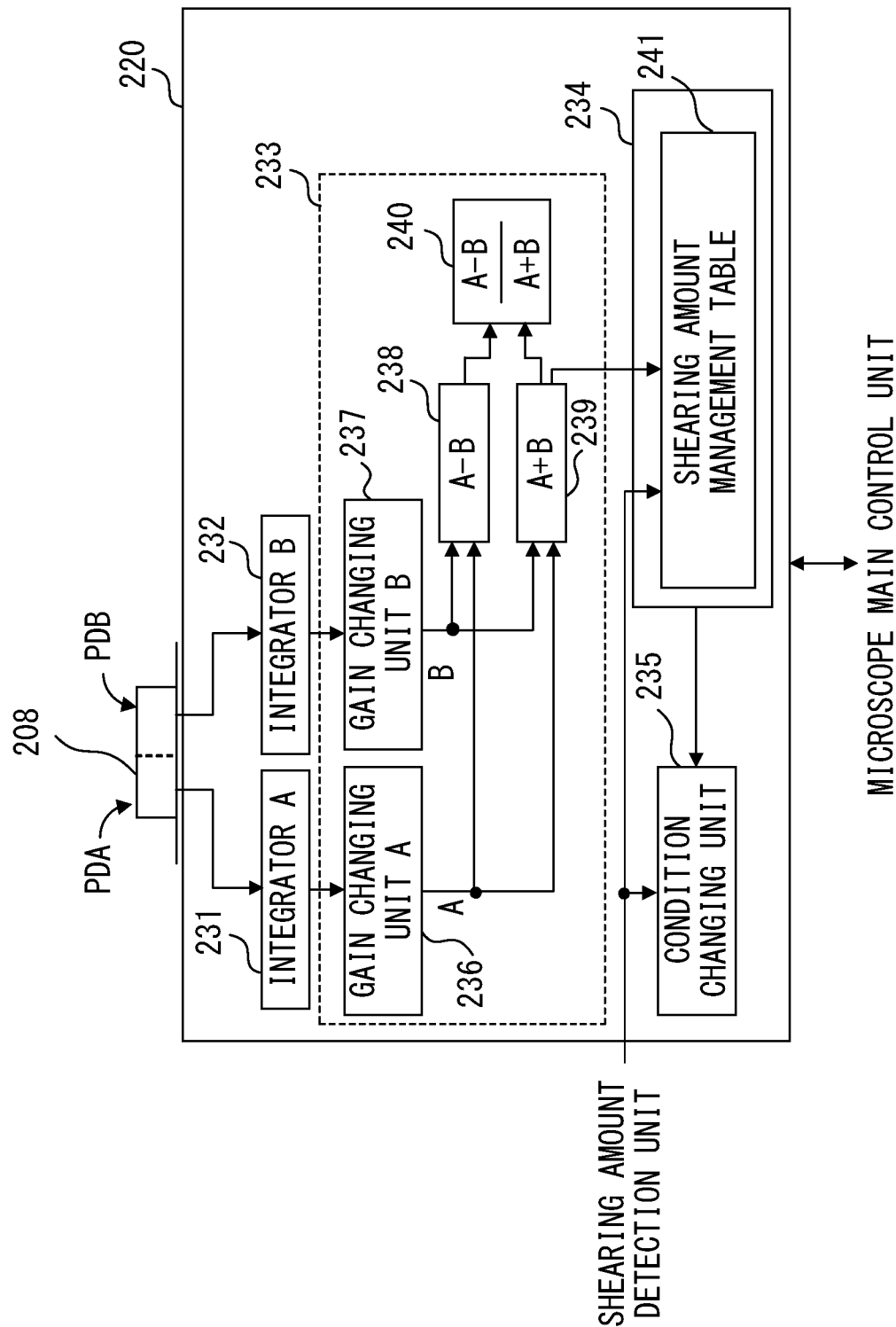
FIG. 2 illustrates an example of a configuration of an AF control unit in Embodiment 1.

Described below are embodiments of the present invention with reference to the drawings.

Embodiment 1

FIG. 1 illustrates an example of a configuration of a microscope device that includes a focusing device and a differential interference observation mechanism in Embodiment 1 of the present invention.

As illustrated in FIG. 1, a microscope device 100 includes a microscope body 200, a PC (Personal Computer) 300, and a monitor 400, and is configured to transmit/receive signals between the microscope body 200 and the PC 300 and between the PC 300 and the monitor 400.

The microscope body 200 includes a focusing detection optical system and a differential interference observation optical system as an optical system, and a portion of the focusing detection optical system is used in common with a portion of the differential interference observation optical system.

The focusing detection optical system includes an AF (Auto Focus) light source 201, a PBS (Polarization Beam Splitter) 202, a λ/4 plate 203, half mirrors 204 and 205, a DIC (Differential Interference Contrast) prism (a differential interference prism) 206, an objective lens 207, and a PD (Photo Detector) 208. The AF light source 201 emits a laser beam (e.g., a P-polarized laser beam) as light for focusing detection. The AF light source 201 is an example of a light source that emits light with which a measurement surface of an observation sample is irradiated. The PBS 202 transmits a P polarization component of incident light and reflects an S polarization component of the incident light. The λ/4 plate 203 converts light from the PBS 202 into circularly polarized light, and converts light from the half mirror 204 into linearly polarized light. The half mirror 204 as a focusing detection optical system reflects incident light. The half mirror 205 as a focusing detection optical system transmits incident light. The PD 208 is a bipartite photo detector, and the PD 208 detects light from the PBS 202 and outputs detection results to the AF control unit 220. The PD 208 is an example of a photo detector that detects light from a measurement surface of an observation sample.

In the focusing detection optical system as described above, only a P polarization component of a laser beam (e.g., a P-polarized laser beam) emitted from the AF light source 201 passes through the PBS 202 and is converted into circularly polarized light by the λ/4 plate 203. Then, the circularly polarized light is reflected by the half mirror 204 and passes through the half mirror 205, and is applied to the observation sample 209 via the DIC prism 206 and the objective lens 207. The reflected light from the observation sample 209 passes through the half mirror 205 via the objective lens 207 and the DIC prism 206, and is reflected by the half mirror 204. Further, the reflected light is converted into linearly polarized light by the λ/4 plate 203, and only an S polarization component thereof is reflected by the PBS 202 and is received by the PD 208.

On the other hand, the differential interference observation optical system includes an observation light source 210, a PO (Polarizer) 211, half mirrors 204 and 205, a DIC prism 206, an objective lens 207, an AN (Analyzer) 212, and an eyepiece 213. The observation light source 210 emits light for observation. The PO 211 converts the light from the observation light source 210 into light having a specific polarization component. The half mirror 205 as a differential interference observation optical system reflects the light from the PO 211, and transmits light from the DIC prism 206. The half mirror 204 as a differential interference observation optical system transmits light from the half mirror 205. The AN 212 transmits only a specific polarization component of the light from the half mirror 204. A combination of the PO 211 and the AN 212 realizes a crossed nicol state needed for differential interference observation. The eyepiece 213 guides the light from the AN 212 to the naked eye of a user (an observer).

In the differential interference observation optical system as described above, the light emitted from the observation light source 210 is converted into light having a specific polarization component by the PO 211, is reflected by the half mirror 205, and is applied to the observation sample 209 via the DIC prism 206 and the objective lens 207. Then, the reflected light from the observation sample 209 passes through the half mirrors 205 and 204 via the objective lens 207 and the DIC prism 206, and then only a specific polarization component of the reflected light from the observation sample 209 is transmitted by the AN 212 and is guided to the naked eye of a user by the eyepiece 213.

The microscope body 200 further includes an AF light source control unit 214, an observation light source control unit 215, a shearing amount detection unit 216, a DIC prism driving unit 217, a stage 218, a stage driving unit 219, an AF control unit 220, and a microscope main control unit 221. The AF light source control unit 214 controls the AF light source 201 under the control of the microscope main control unit 221. The AF light source control unit 214 controls, for example, an output, a duty ratio, and the like of a laser beam emitted from the AF light source 201. The observation light source control unit 215 controls the observation light source 210 under the control of the microscope main control unit 221. The shearing amount detection unit 216 detects a shearing amount of the DIC prism 206 and outputs detection results to the AF control unit 220. The shearing amount refers to a displacement amount of a DIC prism position from an origin position within a movable range of the DIC prism. The shearing amount is defined as above because, when the DIC prism position is changed, an amount of shear is also changed. The DIC prism driving unit 217 drives (moves) the DIC prism 206 under the control of the microscope main control unit 221. On the stage 218, the observation sample 209 is mounted. The stage driving unit 219 drives (moves) the stage 218 in XYZ directions under the control of the microscope main control unit 221. An XY direction is a direction parallel to a stage plane on which the observation sample 209 is mounted, and a Z direction is a direction vertical to the stage plane. The AF control unit 220 controls the AF operation or the like under the control of the microscope main control unit 221. A configuration of the AF control unit 220 is described below in detail with reference to FIG. 2. The microscope main control unit 221 controls the whole operation of the microscope body 200.

The PC 300 includes an operation unit, such as a keyboard or a mouse, and receives various instructions from a user. The PC 300 may also receive various instructions from a user via a touch panel provided on a display screen of the monitor 400. When the PC 300 receives various instructions from a user, the PC 300 outputs, for example, corresponding instruction signals to the microscope main control unit 221. The PC 300 also displays various kinds of information on the monitor 400.

FIG. 2 illustrates an example of a configuration of the AF control unit 220 in this embodiment.

As illustrated in FIG. 2, the AF control unit 220 includes an integrator 231 (an integrator A), an integrator 232 (an integrator B), a signal processing unit 233, a storage unit 234, and a condition changing unit 235.

The integrator 231 integrates output signals from one side (PDA) of the PD 208 that is a bipartite photo detector during an integration time that is within a range of a set maximum integration time and at which an S/N ratio is the greatest. The integrator 232 integrates output signals from the other side (PDB) of the PD 208 that is the bipartite photo detector during an integration time that is within a range of a set maximum integration time and at which an S/N ratio is the greatest. The maximum integration time and the integration time that is within a range of the maximum integration time and at which an S/N ratio is the greatest in the integrator 231 are the same as those in the integrator 232. The integrators 231 and 232 are examples of an integration unit that integrates output signals from a photo detection unit within a range of a maximum integration time.

The signal processing unit 233 includes a gain changing unit 236 (a gain changing unit A), a gain changing unit 237 (a gain changing unit B), and arithmetic units 238, 239, and 240.

The gain changing unit 236 changes the signal intensity of an output signal from the integrator 231 according to a set gain. The gain changing unit 237 changes the signal intensity of an output signal from the integrator 232 according to a set gain. The gains in the gain changing unit 236 and 237 are the same values.

The arithmetic unit 238 calculates A-B using an output signal A from the gain changing unit 236 and an output signal B from the gain changing unit 237. The arithmetic unit 239 calculates A+B using the output signal A from the gain changing unit 236 and the output signal B from the gain changing unit 237. Hereinafter, an arithmetic result signal of the arithmetic unit 239 is also referred to as an AF signal or an AF signal intensity. The arithmetic unit 240 calculates (A−B)/(A+B) using an arithmetic result signal of the arithmetic unit 238 and an arithmetic result signal of the arithmetic unit 239. An arithmetic result signal of the arithmetic unit 240 is also an error signal near a focusing point of a measurement surface of the observation sample 209. In the AF control unit 220, according to the error signal, a position (a Z-direction position) of the stage 218 where the error signal is 0 is detected as a focusing position, a driving signal for moving the stage 218 to the focusing position is output to the stage driving unit 219 via the microscope main control unit 221, and as a result, the AF is performed.

The storage unit 234 stores a shearing amount management table 241. The shearing amount management table 241 is generated on the basis of an output signal from the shearing amount detection unit 216 and the AF signal in accordance with the shearing amount management table generation procedure, as described below in detail. The shearing amount management table 241 is an example of a table that indicates a correspondence relation between a shearing amount of a differential interference prism and a signal intensity range of a signal based on an output signal from a photo detection unit.

The condition changing unit 235 changes a shearing amount of the DIC prism 206 as an acquisition condition of an error signal on the basis of the shearing amount management table 241 and an output signal from the shearing amount detection unit 216, as described below in detail. The shearing amount is changed in response to the output of a driving signal for changing the shearing amount of the DIC prism 206 to the DIC prism driving unit 217 via the microscope main control unit 221.

In the AF control unit 220, a configuration including at least the integrators 231 and 232 and the signal processing unit 233 is an example of a focusing detection unit that detects an error signal near a focusing point of a measurement surface of an observation sample on the basis of an output signal from a photo detection unit.

Described next is the shearing amount management table generation procedure.

Once this procedure has been performed, the procedure does not need to be performed again even when an observation sample is changed afterwards, but the procedure may be performed every time the observation sample is changed.

The shearing amount management table generation procedure is performed in accordance with processes (1)-(6) described below.

(1) First, a user provides an instruction via the PC 300 so as to remove the DIC prism 206 from an optical path, perform the AF for the observation sample 209 that is mounted on the stage 218 in this state, and move the stage 218 to a focusing position. As a result, the position of the stage 218 is a position in which a greater AF signal intensity is acquired as an AF signal intensity acquired in the process (4) described below.

(2) Then, the user provides an instruction via the PC 300 so as to return the DIC prism 206 to the optical path. The position of the DIC prism 206 in this state is determined to be an initial position.

(3) Then, the user provides an instruction to generate a shearing amount management table via the PC 300 so as to start an AF signal intensity acquisition operation. When the AF signal intensity acquisition operation is started, a laser beam starts to be emitted from the AF light source 201, and in the AF control unit 220, a process of acquiring an AF signal intensity from an output signal from the PD 208 that receives a reflected light from the observation sample 209 is started.

(4) Then, the user provides an instruction via the PC 300 so as to change the shearing amount of the DIC prism 206 by a specified amount. Namely, the position of the DIC prism 206 is moved by the specified amount.

(5) Then, the user provides an instruction via the PC 300 so as to start the data registration in the shearing amount management table 241. In this data registration, a shearing region can be registered manually or automatically. The shearing region is defined by a prescribed signal intensity range. For example, a shearing region in which an acquired AF signal intensity is a maximum signal intensity (Peak) is defined to be the shearing region 0. A shearing region in which the acquired AF signal intensity is below the Peak and 50% or more of the Peak is defined to be the shearing region 1. A shearing region in which the acquired AF signal intensity is less than 50% of the Peak is defined to be the shearing region 2. Here, the maximum signal intensity (Peak) represents an available maximum AF signal intensity. As described above, the shearing region is defined by the signal intensity range, and therefore the shearing region may also be referred to as a signal intensity range. The number of shearing regions and a signal intensity range that defines each of the shearing regions may be changed arbitrarily.

In a data registration in which the shearing region is manually registered, a current shearing amount (a shearing amount detected by the shearing amount detection unit 216) is automatically registered, and the user registers a shearing region via the PC 300. An AF signal intensity acquired at this point is displayed on the monitor 400, for example, and the user can register the shearing region on the basis of the AF signal intensity.

In a data registration in which the shearing region is automatically registered, when the shearing amount of the DIC prism 206 is changed by a specified amount, a current shearing amount, an AF signal intensity acquired currently, and a shearing region that the AF signal intensity belongs to are automatically registered.

This automatic registration is performed, for example, by the AF control unit 220.

(6) The above processes (4) and (5) are repeated. When the shearing amount reaches the limit (a maximum), the generation of the shearing amount management table 241 is finished automatically. Alternatively, the user provides an instruction via the PC 300 so as to finish the generation of the shearing amount management table 241.

As a result, a shearing amount management table 241 that has been generated by the manual registration of the shearing region is a table that indicates a correspondence relation between a shearing amount and a shearing region. A shearing amount management table 241 that has been generated by the automatic registration of the shearing region is a table that indicates a correspondence relation between a shearing amount, an AF signal intensity, and a shearing region.

In this shearing amount management table generation procedure, for example, when a user provides an instruction to generate the shearing amount management table via the PC 300, the above processes (2) to (6) may be performed automatically.

FIG. 3, FIG. 4, FIG. 5, and FIG. 6 are diagrams that illustrate examples of the shearing amount management table 241 that has been generated in accordance with the shearing amount management table generation procedure.

A shearing amount management table 241 illustrated in FIG. 3 is an example in which, in the shearing amount management table generation procedure, shearing regions have been classified into three categories and the shearing regions have been registered automatically. In this example, a shearing region in which an acquired AF signal intensity is a maximum signal intensity (Peak) is defined to be the shearing region 0. A shearing region in which the acquired AF signal intensity is below the Peak and is 50% or more of the Peak is defined to be the shearing region 1. A shearing region in which the acquired AF signal intensity is less than 50% of the Peak is defined to be the shearing region 2. In this case, in the shearing region 0, a shearing amount=200. In the shearing region 1, 100≤ shearing amount<200, 200<shearing amount<400, and 900≤ shearing amount≤1000. In the shearing region 2, 0≤shearing amount<100, and 400≤shearing amount<900.

A shearing amount management table 241 illustrated in FIG. 4 is an example in which, in the shearing amount management table generation procedure, shearing regions have been classified into two categories and the shearing regions have been registered manually. In this example, a shearing region in which an acquired AF signal intensity is 50% or more of the maximum signal intensity (Peak) is defined to be the shearing region 1. A shearing region in which the acquired AF signal intensity is less than 50% of the Peak is defined to be the shearing region 2. In this case, in the shearing region 1, 100≤shearing amount<400, and 900 shearing amount≤1000, and in the shearing region 2, 0≤shearing amount<100, and 400≤shearing amount<900.

A shearing amount management table 241 illustrated in FIG. 5 is an example in which, in the shearing amount management generation procedure, shearing regions have been classified into two categories and the shearing regions have been registered automatically. Similarly to the table in FIG. 4, in this example, a shearing region in which an acquired AF signal intensity is 50% or more of the maximum signal intensity (Peak) is defined to be the shearing region 1, and a shearing region in which the acquired AF signal intensity is less than 50% of the Peak is defined to be the shearing region 2. Also in this case, in the shearing region 1, 100≤shearing amount<400, and 900≤shearing amount≤1000. In the shearing region 2, 0≤shearing amount<100, and 400≤shearing amount<900.

A shearing amount management table 241 illustrated in FIG. 6 is an example in which, in the shearing amount management table generation procedure, shearing regions have been classified into four categories and the shearing regions have been registered automatically. In this example, a shearing region in which an acquired AF signal intensity is 50% or more of the maximum signal intensity (Peak) is defined to be the shearing region 1, a shearing region in which the acquired AF signal intensity is less than 50% of the Peak and is 30% or more of the Peak is defined to be the shearing region 2, a shearing region in which the acquired AF signal intensity is less than 30% of the Peak and is 10% or more of the Peak is defined to be the shearing region 3, and a shearing region in which the acquired AF signal intensity is less than 10% of the Peak is defined to be the shearing region 4. In this case, in the shearing region 1, 100≤shearing amount<400, and 900≤shearing amount≤1000. In the shearing region 2, 0≤shearing mount<100, 400≤shearing amount<500, and 800≤shearing amount<900. In the shearing region 3, 500≤shearing amount<600, and 700≤shearing amount<800. In the shearing region 4, 600≤shearing amount<700.

Described next is an AF operation that is performed in differential interference observation.

Figure 7:
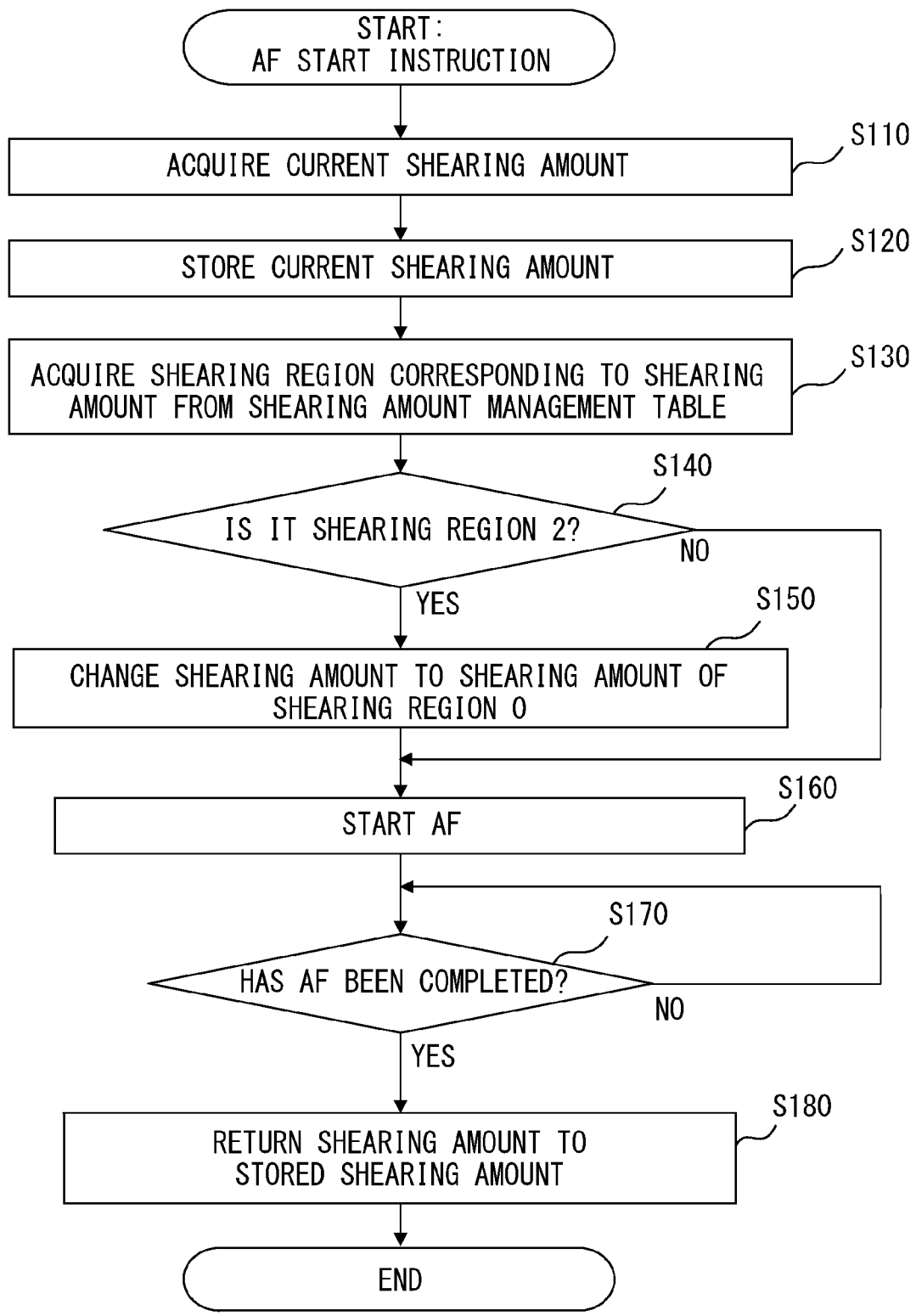
FIG. 7 is an example of a flowchart illustrating an AF operation in Embodiment 1 that is performed in differential interference observation.

FIG. 7 is an example of a flowchart illustrating the AF operation.

This operation is started in response to an AF starting instruction by a user via the PC 300 after the user adjusts a shearing amount of the DIC prism 206 so as to be an interference color that is suitable for the differential interference observation. The shearing amount is adjusted while the user repeatedly provides an instruction to drive the DIC prism 206 via the PC 300. Assume that a shearing amount management table 241 used in this operation is a table illustrated in FIG. 3 as an example.

As illustrated in FIG. 7, when this operation is started, the AF control unit 220 acquires a current shearing amount of the DIC prism 206 on the basis of an output signal from the shearing amount detection unit 216 (S110), and stores the current shearing amount, for example, in the storage unit 234 (S120).

Then, the condition changing unit 235 acquires a shearing region corresponding to the shearing amount acquired in S110 from the shearing amount management table 241 (S130), and determines whether the shearing region is the shearing region 2 (S140). This determination is for determining whether an AF signal intensity corresponding to the shearing amount acquired in S110 is less than 50% of the maximum signal intensity (Peak).

In the determination of S140, when a determination result is Yes, the condition changing unit 235 acquires a shearing amount corresponding to the shearing region 0 from the shearing amount management table 241, and changes the shearing amount of the DIC prism 206 to the acquired shearing amount (S150). This is performed, specifically, when a driving signal for changing the shearing amount of the DIC prism 206 to the acquired shearing amount is output to the DIC prism driving unit 217 via the microscope main control unit 221.

After the process of S150 is performed or when the determination result in S140 is No, the AF control unit 220 starts the AF (S160). In the AF, the integration times in the integrators 231 and 232 are set to be a time that is within a range of a set maximum integration time and at which an S/N ratio is the greatest. Then, the AF control unit 220 determines whether the AF has been completed (S170), and repeats this determination when the determination result is No.

On the other hand, in a case in which the determination result in S170 is Yes, only when the determination result in S140 is Yes, the condition changing unit 235 reads the shearing amount stored in S120, and returns the shearing amount of the DIC prism 206 to the read shearing amount (S180). This is performed, specifically, when a driving signal for returning the shearing amount of the DIC prism 206 to the read shearing amount is output to the DIC prism driving unit 217 via the microscope main control unit 221.

Then, this operation is finished.

As described above, in the focusing device in this embodiment, when an AF signal intensity is low due to an influence of the DIC prism 206 in the AF operation in the differential interference observation, the AF is performed after the shearing amount of the DIC prism 206 is changed so that an error signal that enables a focusing detection with a high accuracy is acquired, and therefore a focusing detection with a high accuracy is attained. In addition, in the AF operation described above, the DIC prism 206 is not moved to a position out of an optical path, and therefore the time needed for a focusing detection can be shortened, compared with an AF operation of a conventional focusing device that requires removing a DIC prism from an optical path.

In this embodiment, in S150 of FIG. 7, for example, a shearing amount corresponding to a maximum AF signal intensity may be acquired from the shearing amount management table 241, and the shearing amount of the DIC prism 206 may be changed to the acquired shearing amount. Also when the shearing amount management table 241 illustrated in FIG. 5 or FIG. 6 is used for example, instead of the shearing amount management table 241 illustrated in FIG. 3, a similar acquisition and changing may be performed.

In addition, in this embodiment, when the AF operation illustrated in FIG. 7 is performed using the shearing amount management table 241 illustrated in FIG. 4 or FIG. 5, in S150 of FIG. 7, for example, the condition changing unit 235 may acquire a shearing amount corresponding to the shearing region 1 from the shearing amount management table 241, and change the shearing amount of the DIC prism 206 to the acquired shearing amount. Here, when the shearing amount management table 241 has a plurality of shearing amounts that correspond to the shearing region 1, any of the shearing amounts may be acquired. Alternatively, a shearing amount that is closest to the current shearing amount may be acquired from among the plurality of shearing amounts.

In addition, in this embodiment, when the AF operation illustrated in FIG. 7 is performed using the shearing amount management table 241 illustrated in FIG. 6, in S140 of FIG. 7, it may be determined for example whether the current shearing amount corresponds to any of the shearing regions 2, 3, and 4. In this case, in S150 of FIG. 7, for example, the condition changing unit 235 may acquire a shearing amount that corresponds to the shearing region 1 from the shearing amount management table 241 and change the shearing amount of the DIC prism 206 to the acquired shearing amount, similarly to the above. Here, when the shearing amount management table 241 has a plurality of shearing amounts that correspond to the shearing region 1, any of the shearing amounts may be acquired. Alternatively, a shearing amount that is closest to the current shearing amount may be acquired from among the plurality of shearing amounts.

In addition, in this embodiment, for example, the processes of S130 and S140 may be omitted from the AF operation illustrated in FIG. 7. In this case, the process of S150 may be changed, for example, similarly to the above.

Further, in this embodiment, a shearing amount management table 241 may be generated for each type (e.g., magnification) of an objective lens. In this case, for example, in S110 of FIG. 7, a detection result of an objective lens detection unit not illustrated that detects the type (e.g., magnification) of an objective lens in an optical path may be acquired, and a shearing amount management table 241 that is used in S130 of FIG. 7 may be selected according to the detection result.

Embodiment 2

In Embodiment 2, the same components as those described in Embodiment 1 are described with the same reference numerals denoted.

Figure 8:
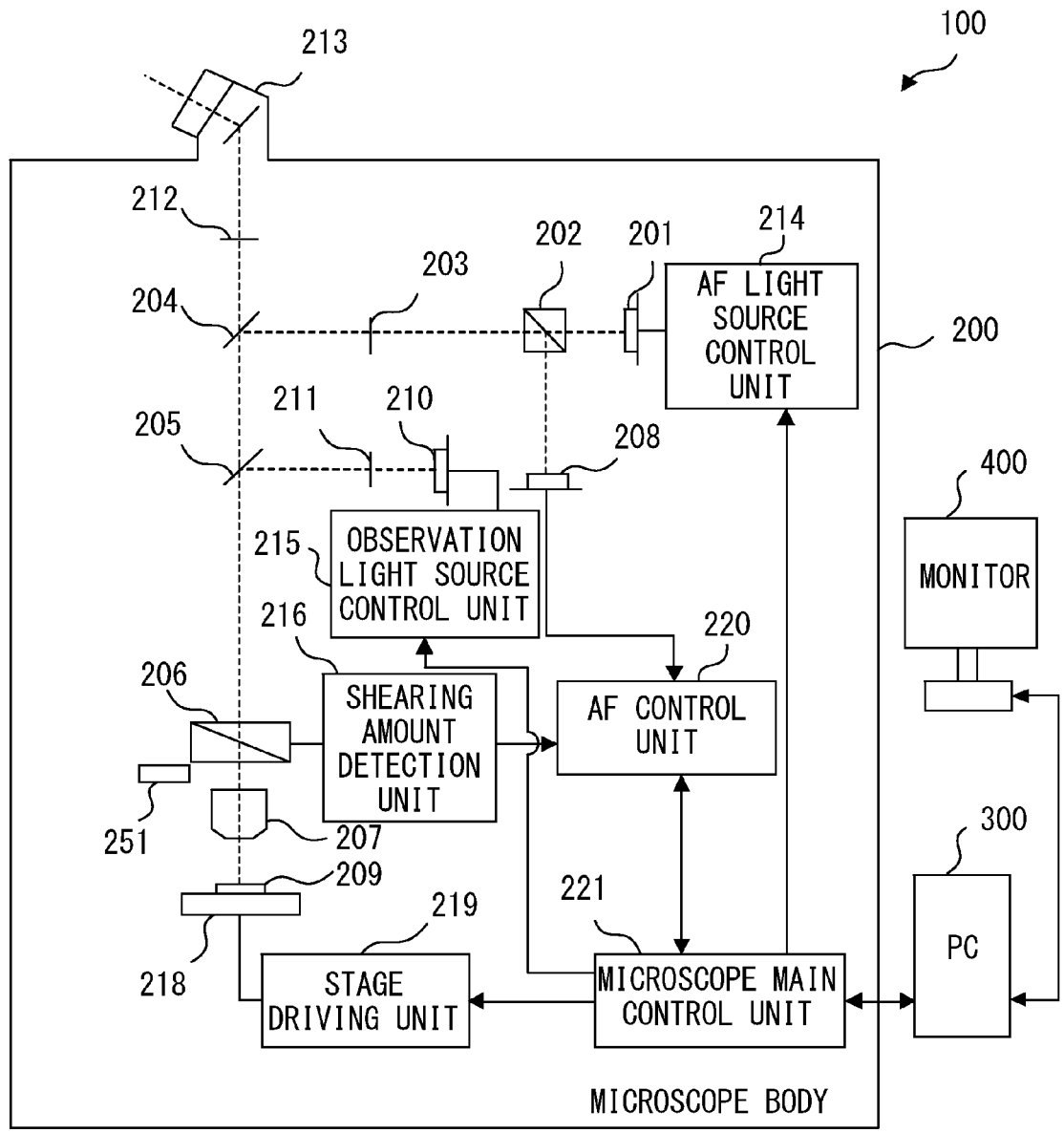
FIG. 8 illustrates an example of a configuration of a microscope device that includes a focusing device and a differential interference observation mechanism in Embodiment 2.

FIG. 8 illustrates an example of a configuration of a microscope device that includes a focusing device and a differential interference observation mechanism in Embodiment 2 of the present invention.

A microscope 100 in FIG. 8 is different from the microscope device 100 in FIG. 1 in that a DIC prism 206 is driven manually, not electrically. Specifically, the microscope device 100 in FIG. 8 is different from the microscope device 100 in FIG. 1 in that the microscope device 100 in FIG. 8 includes a DIC prism rotary knob (hereinafter simply referred to as a "rotary knob") 251 instead of the DIC prism driving unit 217. The rotary knob 251 is for manually driving (moving) the DIC prism 206, and the DIC prism 206 moves when a user rotates the rotary knob 251. In FIG. 8, the other components are similar to those in Embodiment 1, and therefore the descriptions are omitted.

Figure 9:
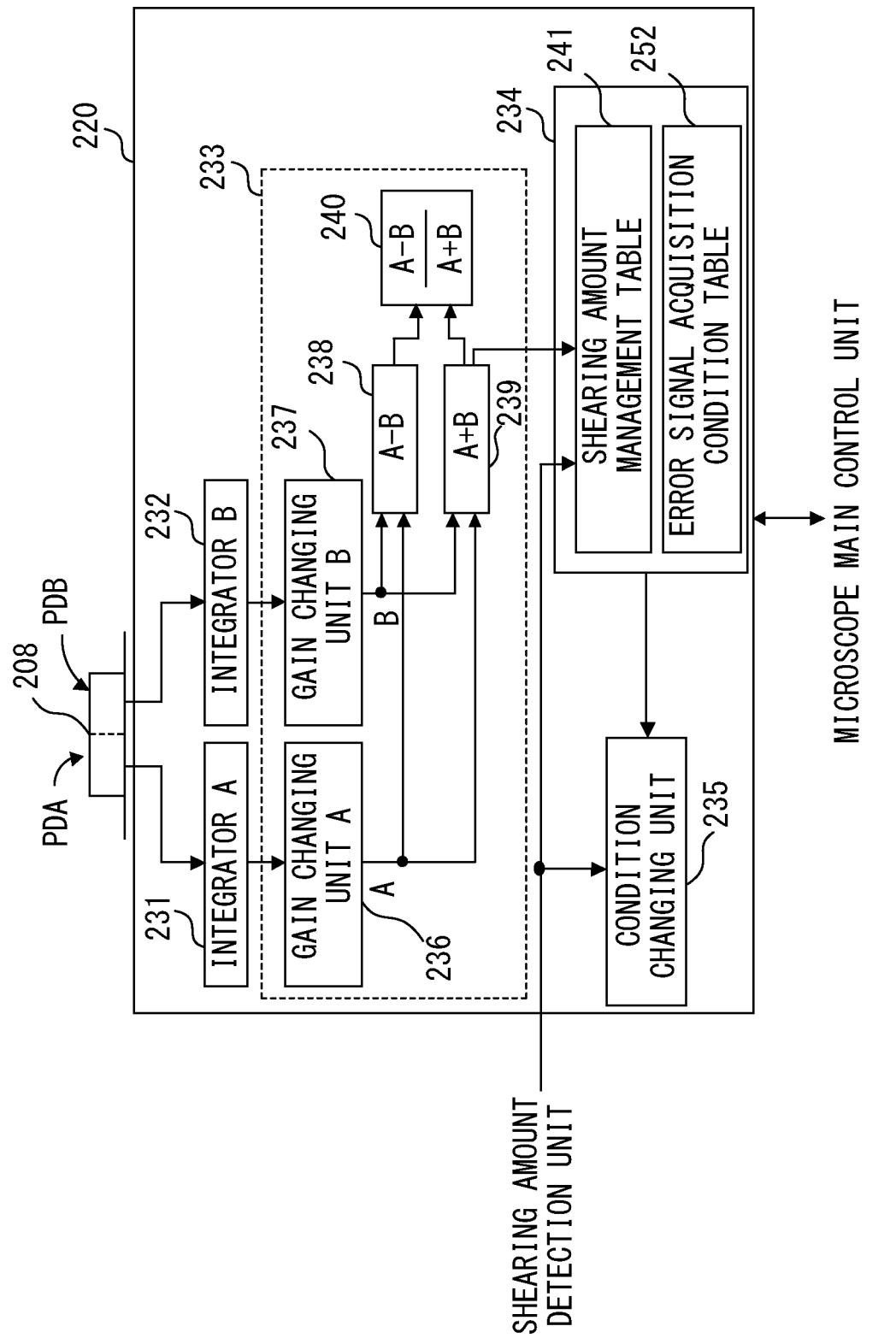
FIG. 9 illustrates an example of a configuration of an AF control unit in Embodiment 2.

FIG. 9 illustrates an example of a configuration of an AF control unit 220 in this embodiment.

The AF control unit 220 in FIG. 9 is different from the AF control unit 220 in FIG. 2 in that a storage unit 234 further stores an error signal acquisition condition table 252 and in the operation of a condition changing unit 235. The error signal acquisition condition table 252 includes information on an error signal acquisition condition that enables a focusing detection with a high accuracy even when an AF signal intensity is low due to an influence of the DIC prism 206, and is a table that has been generated on the basis of relevant experimental results or the like. Specifically, the error signal acquisition condition table 252 is a table that indicates a correspondence relation between a shearing region, change information of maximum integration times in integrators 231 and 232, change information of gains in gain changing units 236 and 237, and change information of an output condition of a laser beam emitted from an AF light source 201. The error signal acquisition condition table 252 is an example of a table that indicates a correspondence relation between a signal intensity range of a signal based on an output signal from a photo detection unit and error signal acquisition condition change information. The condition changing unit 235 in this embodiment changes any one or more of the maximum integration times in the integrators 231 and 232, the gains in the gain changing units 236 and 237, and the output condition of the laser beam emitted from the AF light source 201 as an acquisition condition of an error signal on the basis of the shearing amount management table 241, the error signal acquisition condition table 252, and an output signal from a shearing amount detection unit 216, as described below in detail. The output condition of the laser beam is changed, specifically, when a control signal for changing the output condition of the laser beam is output to an AF light source control unit 214 via the microscope main control unit 221. In FIG. 9, the other components are the same as those in Embodiment 1, and the descriptions are omitted.

Figure 10:
FIG. 10 is a first diagram illustrating an example of an error signal acquisition condition table.

FIG. 10 and FIG. 11 illustrate examples of the error signal acquisition condition table 252.

The error signal acquisition condition table 252 in FIG. 10 is an example in which shearing regions have been classified into two categories. In this example, the shearing regions 1 and 2 correspond to the shearing regions 1 and 2 of the shearing amount management tables 241 illustrated in FIG. 4 and FIG. 5.

The error signal acquisition condition table 252 in FIG. 11 is an example in which shearing regions have been classified into four categories. In this example, the shearing regions 1, 2, 3, and 4 correspond to the shearing regions 1, 2, 3, and 4 of the shearing amount management table 241 illustrated in FIG. 6.

In the error signal acquisition condition tables 252 in FIG. 10 and FIG. 11, an "addition value (to maximum integration time)" and a "coefficient (to maximum integration time)" represent change information of maximum integration times in the integrators 231 and 232. A "duty ratio (of laser pulse)" and a "coefficient (to laser output)" represent change information of the output condition of the laser beam emitted from the AF light source 201. A "coefficient (to AF signal intensity)" represents change information of gains in the gain changing units 236 and 237. From among these, the "addition value (to maximum integration time)", the "coefficient (to maximum integration time)", the "duty ratio (of laser pulse)", and the "coefficient (to laser output)" contribute to a change in an S/N ratio (an increase in an S/N ratio) of an error signal. In addition, the "coefficient (to AF signal intensity)" contributes to a change in a gain (an increase in a gain) of the error signal.

As illustrated in FIG. 10 and FIG. 11, in the error signal acquisition condition table 252, change information is set so that the maximum integration times in the integrators 231 and 232 become longer, the output of the laser beam emitted from the AF light source 201 is increased, and the gains in the gain changing units 236 and 237 are increased as the signal intensity range of the shearing region becomes lower.

The shearing amount management table 241 in this embodiment is as described in Embodiment 1, and in this embodiment, the shearing amount management table 241 is generated essentially in accordance with the shearing amount management table generation procedure described in Embodiment 1. However, in this embodiment, the DIC prism 206 is driven manually, not electrically, and therefore the DIC prism 206 is driven manually while the DIC prism 206 is driven electrically in the shearing amount management table generation procedure described in Embodiment 1. Specifically, with respect to the process (2) in the shearing amount management table generation procedure described in Embodiment 1, in this embodiment, a user rotates the rotary knob 251 so as to move the DIC prism 206 to an initial position. With respect to the process (4), in this embodiment, a user rotates the rotary knob 251 by a specified amount so as to change a shearing mount of the DIC prism 206 by a specified amount. The other processes are similar to those in Embodiment 1.

Described next is an AF operation in this embodiment that is performed in the differential interference observation.

Figure 12:
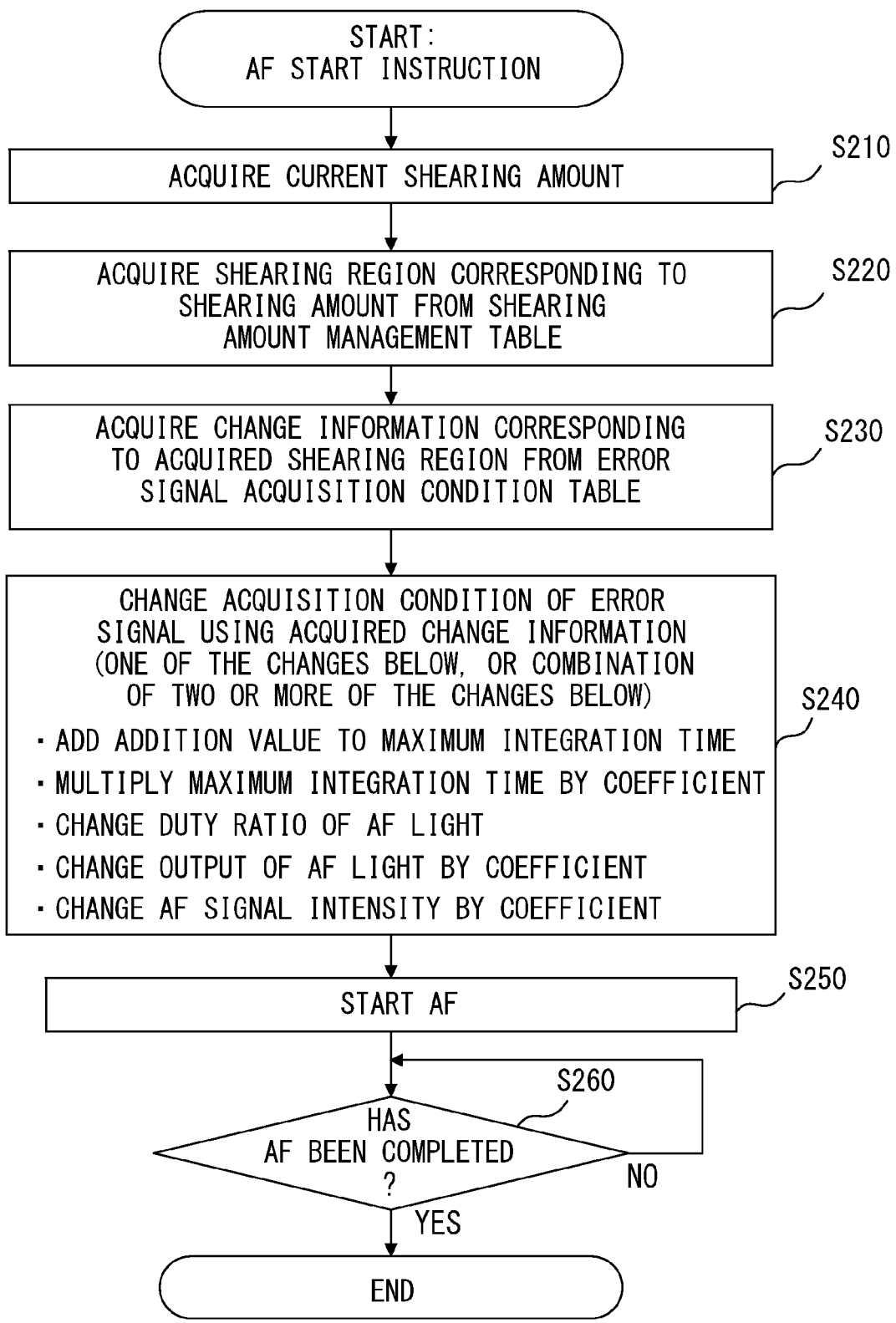
FIG. 12 is an example of a flowchart illustrating an AF operation in Embodiment 2 that is performed in differential interference observation.

FIG. 12 is an example of a flowchart illustrating the AF operation.

Similarly to Embodiment 1, this operation is started in response to an AF start instruction by a user via the PC 300 after the user adjusts the shearing amount of the DIC prism 206 to be an interference color suitable for the differential interference observation. However, the shearing amount is adjusted when the user rotates the rotary knob 251. In addition, a shearing amount management table 241 and an error signal acquisition condition table 252 used in this operation are, for example, the shearing amount management table 241 illustrated in FIG. 5 and the error signal acquisition condition table 252 illustrated in FIG. 10, or the shearing amount management table 241 illustrated in FIG. 6 and the error signal acquisition condition table 252 illustrated in FIG. 11.

As illustrated in FIG. 12, when this operation is started, the AF control unit 220 acquires the current shearing amount of the DIC prism 206 on the basis of an output signal from the shearing amount detection unit 216 (S210).

Then, the condition changing unit 235 acquires a shearing region corresponding to the shearing amount acquired in S210 from the shearing amount management table 241 (S220), and acquires change information corresponding to the shearing region from the error signal acquisition condition table 252 (S230).

Then, the condition changing unit 235 changes an acquisition condition of the error signal using the change information acquired in S230 (S240). Specifically, the condition changing unit 235 changes the acquisition condition of the error signal by any one of the following five changing methods or a combination of two or more of the changing methods.

In the changing method 1, in the integrators 231 and 232, the set maximum integration times are changed to new maximum integration times that are obtained by adding an addition value (to a maximum integration time) acquired from the error signal acquisition condition table 252 to the maximum integration times.

In the changing method 2, in the integrators 231 and 232, the set maximum integration times are changed to new maximum integration times that are obtained by multiplexing the maximum integration times by a coefficient (to a maximum integration time) acquired from the error signal acquisition condition table 252.

In the changing method 3, a duty ratio of a laser beam emitted from the AF light source 201 is changed to a duty ratio (of a laser pulse) acquired from the error signal acquisition condition table 252.

In the changing method 4, an output of the laser beam emitted from the AF light source 201 is changed in accordance with a coefficient (to a laser output) acquired from the error signal acquisition condition table 252.

In the changing method 5, in the gain changing units 236 and 237, the set gains are changed in accordance with a coefficient (to an AF signal intensity) acquired from the error signal acquisition condition table 252.

In the changing methods 1 and 2, the maximum integration times in the integrators 231 and 232 become longer. In the changing methods 3 and 4, the output of the laser beam emitted from the AF light source 201 is increased. In the changing method 5, the gains in the gain changing units 236 and 237 are increased.

The changing in the changing methods 3 and 4 is performed in response to the output of a control signal for the changing to the AF light source control unit 214 via the microscope main control unit 221.

When the process of S240 is finished, the AF control unit 220 starts the AF (S250). In this AF, the integration times in the integrators 231 and 232 are set to a time that is within a range of the set maximum integration time and at which an S/N ratio is the greatest. Then, the AF control unit 220 determines whether the AF has been completed (S260), and repeats this determination when the determination result is No.

On the other hand, when the determination result in S260 is Yes, this operation is finished.

As described above, in the focusing device in this embodiment, in the AF operation in the differential interference observation, the AF is performed after any one or more of the maximum integration times in the integrators 231 and 232, the gains in the gain changing units 236 and 237, and the output condition of the laser beam emitted from the AF light source 201 are changed on the basis of the shearing amount of the DIC prism 206 so that an error signal that enables a focusing detection with a high accuracy even when an AF signal intensity is low due to an influence of the DIC prism 206 is acquired, and therefore a focusing detection with a high accuracy is attained. In the AF operation described above, any one or more of the maximum integration times, the gains, and the output condition of the laser beam may be changed, but the shearing amount of the DIC prism 206 is not changed. Therefore, the time needed for the focusing detection can be further shortened. Further, the AF operation described above does not require a mechanism that electrically drives the DIC prism 206 (the DIC prism driving unit 217 in Embodiment 1), and therefore the AF operation described above can be realized inexpensively.

In this embodiment, the shearing amount management table 241 may be generated for each type (e.g., magnification) of an objective lens.

In addition, the error signal acquisition condition table 252 may be a table that includes a correspondence relation with the type of objective lens. Namely, the error signal acquisition condition table 252 may be a table that indicates a correspondence relation between a shearing region, the type of objective lens, change information of maximum integration times in the integrators 231 and 232, change information of the gains in the gain changing units 236 and 237, and change information of the output condition of the laser beam emitted from the AF light source 201.

FIG. 13 and FIG. 14 illustrate examples of the error signal acquisition condition table 252 that includes the correspondence relation with the type of objective lens as described above.

The error signal acquisition condition table 252 illustrated in FIG. 13 is an example in which shearing regions have been classified into two categories. In this example, the shearing regions 1 and 2 correspond to the shearing regions 1 and 2 of the shearing amount management tables 241 illustrated in FIG. 4 an FIG. 5. In this example, in the shearing region 1, the change information of the maximum integration times, the change information of the gains, and the change information of the output condition of the laser beam are fixed even when the type (magnification) of an objective lens is changed.

The error signal acquisition condition table 252 illustrated in FIG. 14 is an example in which shearing regions have been classified into four categories. In this example, the shearing regions 1, 2, 3, and 4 correspond to the shearing regions 1, 2, 3, and 4 of the shearing amount management table 241 illustrated in FIG. 6. Also in this example, in the shearing region 1, the change information of the maximum integration times, the change information of the gains, and the change information of the output condition of the laser beam are fixed even when the type (magnification) of an objective lens is changed.

As described above, when a shearing amount management table 241 is generated for each type of an objective lens and the error signal acquisition condition table 252 is a table that further includes a correspondence relation with the type of the objective lens, in S210 of FIG. 12, for example, a detection result of an objective lens detection unit not illustrated that detects the type (e.g., magnification) of the objective lens in an optical path may be acquired, and a shearing amount management table 241 used in S220 of FIG. 12 and an error signal acquisition condition table 252 used in S230 of FIG. 12 may be selected in accordance with the detection result.

In addition, in this embodiment, the DIC prism 206 may be driven electrically, similarly to Embodiment 1. In this case, also in this embodiment, a shearing amount management table 241 can be generated in accordance with the shearing amount management table generation procedure described in Embodiment 1.

Embodiment 3

In Embodiment 3, the same components as those described in Embodiment 2 are described with the same reference numerals denoted.

FIG. 15 illustrates an example of a configuration of a microscope device that includes a focusing device and a differential interference observation mechanism in Embodiment 3 of the present invention.

A microscope 100 in FIG. 15 is different from the microscope device 100 in FIG. 8 in that the microscope 100 in FIG. 15 includes a camera 261 instead of an eyepiece 213 and does not include a shearing amount detection unit 216. The camera 261 captures a differential interference observation image of an observation sample 209, and outputs image information of the differential interference observation image to an AF control unit 220 and a PC 300. The camera 261 is an example of an imaging unit that captures a differential interference observation image of an observation sample. In FIG. 15, the other components are similar to those in Embodiment 2, and the descriptions are omitted.

Figure 16:
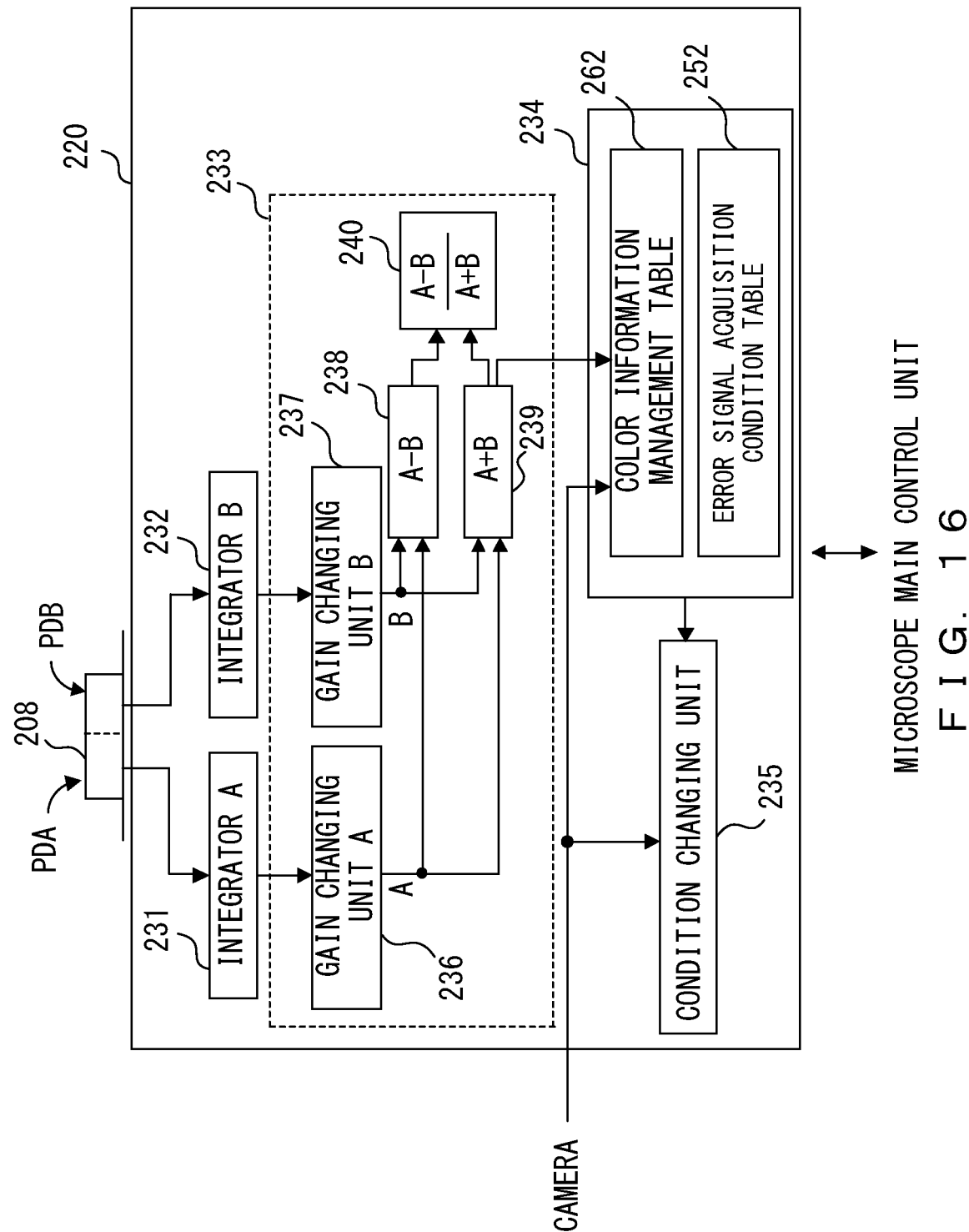
FIG. 16 illustrates an example of a configuration of an AF control unit in Embodiment 3.

FIG. 16 illustrates an example of a configuration of an AF control unit 220 in this embodiment.

The AF control unit 220 in FIG. 16 is different from the AF control unit 220 in FIG. 9 in that image information that is an output signal of the camera 261 is input instead of an output signal of a shearing amount detection unit 216, in that a storage unit 234 stores a color information management table 262 instead of a shearing amount management table 241, and in an operation of a condition changing unit 235. The color information management table 262 is generated on the basis of an output signal of an arithmetic unit 239 and an output signal (image information) of the camera 261 in accordance with a color information management table generation procedure as described below in detail. The color information management table 262 is an example of a table that indicates a correspondence relation between color information of a differential interference observation image of an observation sample and a signal intensity range of a signal based on an output signal of a photo detection unit. A condition changing unit 235 in this embodiment changes any one or more of maximum integration times in integrators 231 and 232, gains in gain changing units 236 and 237, an output condition of a laser beam emitted from an AF light source 201 as an acquisition condition of an error signal on the basis of the color information management table 262, the error signal acquisition condition table 252, and an output signal (image information) of the camera 261, as described below in detail. The output condition of the laser beam is changed, specifically, in response to the output of a control signal for changing the output condition to an AF light source control unit 214 via a microscope main control unit 221. In FIG. 16, the other components are similar to those in Embodiment 2, and the descriptions are omitted.

Described next is the color information management table generation procedure.

Once this procedure has been performed, the procedure does not need to be performed again even when an observation sample is changed later. However, the procedure may be performed every time the observation sample is changed.

The color information management table generation procedure is performed in accordance with the following processes (1)-(6).

(1) A user removes the DIC prism 206 from an optical path and provides an instruction via the PC 300 so as to perform the AF to an observation sample 209 mounted on a stage 218 and move the stage 218 to a focusing position. As a result, the position of the stage 218 is a position at which a greater AF signal intensity can be acquired as an AF signal intensity acquired in the process (4) described below.

(2) Then, after the user returns the DIC prism 206 to the optical path, the user rotates a rotary knob 251 and changes the position of the DIC prism 206 to an initial position. The user performs this, for example, by rotating the rotary knob 251 in a counterclockwise direction until the rotary knob 251 stops.

(3) Then, the user provides a color information management table generation instruction via the PC 300 so as to start an AF signal intensity acquisition operation. When the AF signal intensity acquisition operation is started, a laser beam starts to be emitted from the AF light source 201, and in the AF control unit 220, a process of acquiring an AF signal intensity from an output signal from the PD 208 that receives a reflection light from the observation sample 209 is started.

(4) Then, the user rotates the rotary knob 251 by a specified amount so as to change the shearing amount of the DIC prism 206 by a specified amount.

(5) Then, the user provides an instruction via the PC 300 so as to start the data registration in the color information management table 262. In this data registration, a shearing region can be registered manually or automatically. The shearing region is defined by a prescribed signal intensity range similarly to Embodiment 1 and Embodiment 2. For example, a shearing region in which an acquired AF signal intensity is 1000 or more is defined to be the shearing region 1, and a shearing region in which the acquired AF signal intensity is less than 1000 is defined to be the shearing region 2.

In the data registration in which the shearing region is manually registered, color information of a current differential interference observation image (color information of image information that is an output signal from the camera 261) is automatically registered, and the user registers the shearing region via the PC 300. An AF signal intensity acquired at this point is displayed for example on a monitor 400, and the user can register the shearing region on the basis of the AF signal intensity.

In the data registration in which the shearing region is automatically registered, when a specified time (e.g., a specified time after the above process (4) has been performed) has passed, color information of a differential interference observation image acquired at that point (color information of image information that is an output signal of the camera 261), an AF signal intensity acquired at that point, and a shearing region to which the AF signal intensity belongs are automatically registered. This data registration is performed when a specified time has passed; however, this data registration may be performed when specified pieces of image information have been acquired from the camera 261 that captures images at a prescribed frame rate.

The automatic registration described above is performed for example by the AF control unit 220.

(6) When the above processes (4) and (5) are repeated and the user rotates the rotary knob 251 until the rotary knob stops, the generation of the color information management table 262 is finished automatically. Alternatively, the user provides an instruction via the PC 300 so as to finish the generation of the color information management table 262.

As a result, a color information management table 262 that has been generated by manually registering shearing regions is a table that indicates a correspondence relation between color information and a shearing region. In addition, a color information management table 262 that has been generated by automatically registering shearing regions is a table that indicates a correspondence relation between color information, an AF signal intensity, and a shearing region.

FIG. 17 illustrates an example of a color information management table 262 that has been generated in accordance with the color information management table generation procedure.

A color information management table 262 illustrated in FIG. 17 is an example in which, in the shearing amount management table generation procedure, shearing regions have been classified into two categories and the shearing regions have been registered automatically. In this example, color information of an acquired differential interference observation image is represented by each RGB value, and a shearing region in which an acquired AF signal intensity is 1000 or more is the shearing region 1 and a shearing region in which the acquired AF signal intensity is less than 1000 is the shearing region 2.

FIG. 18 illustrates an example of an error signal acquisition condition table 252.

An error signal acquisition condition table 252 illustrated in FIG. 18 is an example in which shearing regions have been classified into two categories. In this example, the shearing regions 1 and 2 correspond to the shearing regions 1 and 2 of the color information management table 262 in FIG. 17. Details of the error signal acquisition condition table 252 are as described in Embodiment 2, and the descriptions are omitted.

Described next is an AF operation in this embodiment that is performed in the differential interference observation.

Figure 19:
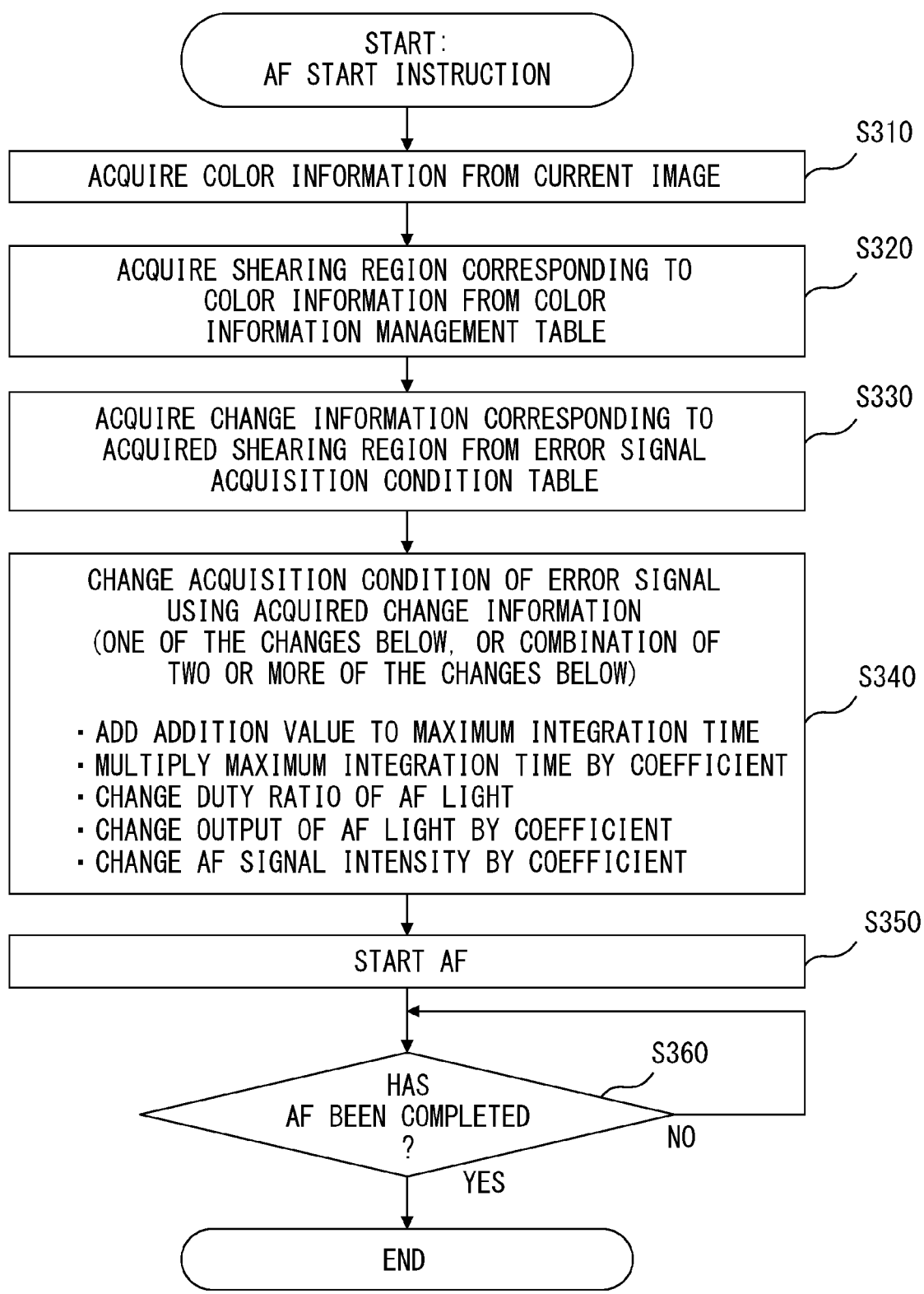
FIG. 19 is an example of a flowchart illustrating an AF operation in Embodiment 3 that is performed in differential interference observation.

FIG. 19 is an example of a flowchart illustrating the AF operation.

Similarly to Embodiments 1 and 2, this operation is started when a user provides an instruction (an AF start instruction) via the PC 300 after adjusting a shearing amount of the DIC prism 206 to an interference color suitable for the differential interference observation. However, the shearing amount is adjusted when the user rotates the rotary knob 251. In addition, a color information management table 262 and an error signal acquisition condition table 252 used in this operation are, for example, the color information management table 262 in FIG. 18 and the error signal acquisition condition table 252 in FIG. 17.

As illustrated in FIG. 19, when this operation is started, the AF control unit 220 acquires color information of a current differential interference observation image on the basis of an output signal of the camera 261 that captures a differential interference observation image of an observation sample 209 (S310).

Then, the condition changing unit 235 acquires a shearing region that corresponds to the color information acquired in S310 from the color information management table 262 (S320). For example, in a case in which the color information is determined to be represented by each RGB value, when each RGB value acquired in S310 is included within a specified range centering around each RGB value registered in the color information management table 262 (e.g., within a range of ±10 of each of the RGB values), a corresponding shearing region is acquired. When there are a plurality of corresponding shearing regions different from each other, any one of the shearing regions may be acquired according to the prescribed priority. For example, when the shearing regions 1 and 2 are acquired from the color information management table 262 in FIG. 17, the shearing region 2 is acquired preferentially. Alternatively, the shearing region 1 may be acquired preferentially.

When the shearing region is acquired from the color information management table 262 as described above, the condition changing unit 235 acquires change information corresponding to the shearing region from the error signal acquisition condition table 252 (S330).

Then, the condition changing unit 235 changes an acquisition condition of an error signal using the change information acquired in S330 (S340). Specifically, the acquisition condition of the error signal is changed by any one of five changing methods or a combination of two or more of the five changing methods. The five changing methods are as described in Embodiment 2, and the descriptions are omitted.

When the process of S340 has been finished, the AF control unit 220 starts an AF (S350). In this AF, integration times in the integrators 231 and 232 are set to be a time that is within a range of a set maximum integration time and at which an S/N ratio is the greatest. Then, the AF control unit 220 determines whether the AF has been completed (S360), and repeats this determination when the determination result is No.

On the other hand, when the determination result in S360 is Yes, this operation is finished.

As described above, in the focusing device in this embodiment, the AF is performed after any one or more of the maximum integration times in the integrators 231 and 232, the gains in the gain changing units 236 and 237, and the output condition of the laser beam emitted from the AF light source 201 are changed on the basis of color information of a differential interference observation image so as to acquire an error signal that enables a focusing detection with a high accuracy even when an AF signal intensity is low due to an influence of the DIC prism 206 in the AF operation on the differential interference observation, and therefore the focusing detection with a high accuracy can be attained. In addition, in the AF operation described above, similarly to Embodiment 2, any one or more of the maximum integration times, the gains, and the output condition of the laser beam may be changed, but the shearing amount of the DIC prism 206 is not changed, and therefore the time needed for the focusing detection can be further shortened. Further, in the AF operation described above, a mechanism that electrically drives the DIC prism 206 (e.g., the DIC prism driving unit 217 in Embodiment 1) or a mechanism that detects the shearing amount of the DIC prism. 206 (e.g., the shearing amount detection units 216 in Embodiments 1 and 2) is not required, and therefore the AF operation described above can be realized at a lower cost.

In this embodiment, the color information management table 262 may be generated for each type (e.g., a magnification) of an objective lens.

In addition, the error signal acquisition condition table 252 may be a table that further includes a correspondence relation with the type of objective lens. Namely, the error signal acquisition condition table 252 may be a table that indicates a correspondence relation between the shearing region, the type of objective lens, the change information of the maximum integration times in the integrators 231 and 232, the change information of the gains in the gain changing units 236 and 237, and the change information of the output condition of the laser beam emitted from the AF light source 201.

FIG. 20 illustrates an example of an error signal acquisition condition table 252 that includes the correspondence relation with the type of objective lens as described above.

An error signal acquisition condition table 252 in FIG. 20 is an example in which shearing regions have been classified into two categories. In this example, the shearing regions 1 and 2 correspond to the shearing regions 1 and 2 of the color information management table 262 illustrated in FIG. 17. In this example, in the shearing region 1, even when the type (magnification) of an objective lens is changed, the change information of the maximum integration times, the change information of the gains, and the change information of the output condition of the laser beam are fixed.

When the color information management table 262 is generated for each type of an objective lens and the error signal acquisition condition table 252 is a table that further includes a correspondence relation with the type of objective lens as described above, for example, in S310 of FIG. 19, a detection result of an objective lens detection unit not illustrated that detects the type (e.g., magnification) of an objective lens in an optical path may be acquired, and a color information management table 262 that is used in S320 of FIG. 19 and an error signal acquisition condition table 252 that is used in S330 of FIG. 19 may be selected according to the detection result.

In addition, in this embodiment, the DIC prism 206 may be configured to be driven electrically similarly to Embodiment 1. In this case, the DIC prism 206 that is manually driven in the color information management table generation procedure can be driven electrically. Specifically, in each of the processes (2) and (4) in the color information management table generation procedure, a user may provide an instruction via the PC 300 so as to electrically drive the DIC prism 206 that has been driven manually. In addition, in this case, the user may provide a color information management table generation instruction so as to automatically perform the processes (2) to (6).

In addition, in this embodiment, the color information of the differential interference observation image of the observation sample 209 is not limited to color information in an RGB format, but color information in another format may be used.

Embodiments 1 to 3 have been described above. In each of the embodiments, an upright microscope is used as the microscope body 200, but an inverted microscope may be used.

The embodiments described above give specific examples of the present invention in order to easily understand the invention, and the present invention is not limited to the embodiments described above. Various modifications or variations of the present invention can be made without departing from the spirit of the present invention specified in the claims.

As described above, the present invention enables providing a focusing device that enables performing a focusing detection with a high accuracy and shortening the time needed for the focusing detection.

What is claimed is:

1. A focusing device that includes a differential interference prism used in differential interference observation in a focusing detection optical system, the focusing device comprising:
    a light source that emits light with which a measurement surface of an observation sample is irradiated;
    a photo detector that detects light from the measurement surface;
    a focusing detection unit that detects an error signal near a focusing point of the measurement surface on the basis of an output signal from the photo detector; and
    a condition changing unit that changes an acquisition condition of the error signal.

2. The focusing device of claim 1, wherein the condition changing unit changes the acquisition condition of the error signal on the basis of a shearing amount of the differential interference prism.

3. The focusing device of claim 2, further comprising:
    a storage unit that stores a table that indicates a correspondence relation between the shearing amount of the differential interference prism and a signal intensity range of a signal based on an output signal from the photo detector, wherein the condition changing unit acquires, from the table, a signal intensity range that corresponds to the shearing amount of the differential interference prism, acquires, from the table, a shearing amount that corresponds to a maximum signal intensity range when the signal intensity range is within a prescribed signal intensity range, and changes the shearing amount of the differential interference prism to the acquired shearing amount.

4. The focusing device of claim 2, further comprising:

a storage unit that stores a first table that indicates a correspondence relation between the shearing amount of the differential interference prism and a signal intensity range of a signal based on the output signal from the photo detector, and a second table that indicates a correspondence relation between the signal intensity range of the signal based on the output signal from the photo detector and error signal acquisition condition change information, wherein the condition changing unit acquires, from the first table, the signal intensity range that corresponds to the shearing amount of the differential interference prism, acquires, from the second table, the error signal acquisition condition change information that corresponds to the signal intensity range, and changes the acquisition condition of the error signal on the basis of the error signal acquisition condition change information.

5. The focusing device of claim 4, wherein the focusing detection unit comprises an integration unit that integrates the output signal from the photo detector within a range of a maximum integration time, and the error signal acquisition condition change information comprises one or more pieces of change information from among change information of the maximum integration time, change information of a gain of an output signal from the integration unit, and change information of an output condition of light emitted from the light source.

6. The focusing device of claim 1, further comprising:

an imaging unit that captures a differential interference observation image of the observation sample, wherein the condition changing unit changes the acquisition condition of the error signal on the basis of color information of the differential interference observation image captured by the imaging unit.

7. The focusing device of claim 6, further comprising:

a storage unit that stores a first table that indicates a correspondence relation between the color information of the differential interference observation image of the observation sample and a signal intensity range of a signal based on the output signal from the photo detector, and a second table that indicates a correspondence relation between the signal intensity range of the signal based on the output signal from the photo detector and error signal acquisition condition change information, wherein the condition changing unit acquires, from the first table, the signal intensity range that corresponds to the color information of the differential interference observation image of the observation sample captured by the imaging unit, acquires, from the second table, the error signal acquisition condition change information that corresponds to the signal intensity range, and changes the acquisition condition of the error signal on the basis of the error signal acquisition condition change information.

8. The focusing device of claim 7, wherein the focusing detection unit comprises an integration unit that integrates the output signal from the photo detector within a range of a maximum integration time, wherein the error signal acquisition condition change information comprises one or more pieces of change information from among change information of the maximum integration time, change information of a gain of an output signal of the integration unit, and change information of an output condition of light emitted from the light source.

* * * * *